United States Patent [19]

Steigelmann et al.

[11] 3,980,605

[45] Sept. 14, 1976

[54] SEMI-PERMEABLE MEMBRANE COMPOSITIONS BASED ON BLENDS OF POLYAMIDES AND POLYVINYL ALCOHOLS

[75] Inventors: Edward F. Steigelmann; Robert D. Hughes, both of Park Forest, Ill.

[73] Assignee: Standard Oil Company, Chicago, Ill.

[22] Filed: Sept. 7, 1973

[21] Appl. No.: 395,055

Related U.S. Application Data

[63] Continuation-in-part of Ser. No. 288,781, Sept. 13, 1972, Pat. No. 3,758,605, and a continuation-in-part of Ser. No. 288,782, Sept. 13, 1972, Pat. No. 3,844,735, and a continuation-in-part of Ser. No. 335,012, Feb. 23, 1973, abandoned.

[52] U.S. Cl. ............................. 260/30.8 DS; 55/16; 260/857 UN
[51] Int. Cl.$^2$ ..................... B01D 51/06; C08L 77/10
[58] Field of Search .......... 260/30.8 DS, 857, 72 N; 55/16

[56] References Cited
UNITED STATES PATENTS

| | | | |
|---|---|---|---|
| 2,806,829 | 9/1957 | Capps ........................ | 260/30.8 DS |
| 2,895,786 | 7/1959 | Schlack ...................... | 260/857 UX |
| 2,988,782 | 6/1961 | Parrish et al. ................ | 260/857 UX |
| 3,080,350 | 3/1963 | Imai et al. ................... | 260/30.8 DS X |
| 3,224,986 | 12/1965 | Butler et al. ................. | 260/857 UX |
| 3,355,409 | 11/1967 | Bissot ........................ | 260/29.6 NR |
| 3,422,008 | 1/1969 | McLain ....................... | 55/16 X |
| 3,705,207 | 12/1972 | Sills .......................... | 260/37 N X |
| 3,711,583 | 1/1973 | Sklar ......................... | 260/72 N X |
| 3,741,945 | 6/1973 | Bourat et al. ................. | 260/30.8 DS X |
| 3,814,792 | 6/1974 | Arakawa et al. ............... | 260/29.6 NR X |

*Primary Examiner*—Lewis T. Jacobs
*Assistant Examiner*—S. M. Person
*Attorney, Agent, or Firm*—Morton, Bernard, Brown, Roberts & Sutherland

[57] ABSTRACT

Semi-permeable membranes are made from polyamides, especially N-alkoxyalkyl polyamides, and water-soluble polyvinyl alcohols. The membranes are preferably formed as fibers. The membranes can be made from compositions containing the polymer components and a di(lower alkyl) sulfoxide, e.g. dimethyl sulfoxide. The membranes may contain complex-forming metal components. The membranes are useful for separating chemicals from their mixtures by techniques using an aqueous liquid barrier and complex-forming metals, e.g. for the separation of aliphatically-unsaturated hydrocarbons such as ethylene from close-boiling hydrocarbons.

37 Claims, No Drawings

SEMI-PERMEABLE MEMBRANE COMPOSITIONS BASED ON BLENDS OF POLYAMIDES AND POLYVINYL ALCOHOLS

This application is a continuation-in-part of our co-pending applications Ser. Nos. 288,781 (U.S. Pat. No. 3,758,605) and 288,782, (U.S. Pat. No. 3,844,735) both filed Sept. 13, 1972, and Ser. No. 335,012, filed Feb. 23, 1973, and now abandoned, all herein incorporated by reference.

This invention relates to the use of polyamide resins, especially N-alkoxyalkyl polyamides, and polyvinyl alcohols to form compositions particularly useful for preparing hydrophilic semi-permeable polymer membranes which may be employed to separate components of chemical mixtures. The invention also pertains to the membrane products formed, and these products may be in cross-linked or other form. A further aspect of the invention is concerned with compositions containing the polyamide and polyvinyl alcohol in admixture with a di(lower alkyl) sulfoxide, and these composites are useful, for example, in making membrane products in hollow fiber form, particularly when the composites contain N-alkoxyalkyl polyamides. The membranes of the invention may be employed along with complex-forming metals to separate aliphatically-unsaturated hydrocarbons from mixtures containing the hydrocarbons to be separated along with other materials. The membranes are especially useful for separating ethylene from gaseous mixtures containing it, other hydrocarbons, for example, one or both of ethane and methane, and with or without hydrogen.

Our prior applications cited above and various publications point out the commercial interest in separating chemicals, for instance aliphatically-unsaturated hydrocarbons, from mixtures containing the chemical to be separated along with one or more other materials. The separation may be accomplished by the combined use of liquid barrier permeation and metal complexing techniques wherein a liquid barrier containing complex-forming metal components in aqueous solution is in contact with a semi-permeable membrane. It is most advantageous that the liquid barrier be at least partly, or even essentially entirely, within the film membrane, and to facilitate this relationship, the membrane can be hydrophilic in character. The membrane must also have satisfactory strength to avoid rupture during use and have other desirable physical properties which permit attainment of good selectivity and adequate separation rates in the separation process. The membrane should preferably be formable in shapes which present a high surface area to the mixture undergoing separation, as in the case of fiber-type membranes which have large contact areas for separation equipment of given size.

By the present invention, we have found that hydrophilic, semi-permeable membranes made from polyamides, especially N-alkoxyalkyl polyamides, and polyvinyl alcohols have excellent strength, permeability characteristics and other physical properties which are desirable when the membranes are employed to separate chemicals, e.g., aliphatically-unsaturated hydrocarbons, from their mixtures by the liquid barrier-complex-forming metal techniques described, for instance, herein and in the foregoing cited patent applications. The semi-permeable membranes are essentially impervious to the passage of liquid under the conditions at which the membranes are used. The membranes are generally comprised of about 30 to 90, preferably about 50 to 70, weight percent of polyamide; and about 10 to 70, preferably about 30 to 50, weight percent polyvinyl alcohol based on the total weight of these components. The membranes have sufficient thickness so as not to be readily ruptured or otherwise undergo physical deterioration at a rate that would make their use unattractive. Generally the membrane thickness may be up to about 30 mils or more, preferably about 0.5 to 15 mils, and often the thickness is at least about 0.001 micron. When the membrane is a hollow fiber, the overall diameter of the fiber may, with advantage, be up to about 75 or more mils, preferably about 1 to 30 mils.

By the present invention, we have found an excellent manner of making the semi-permeable membranes which involves mixing the polyamide and polyvinyl alcohol with a di(lower alkyl) sulfoxide. These composites contain sufficient of the di(lower alkyl) sulfoxide to provide an intimate, compatible admixture of the polyamide and polyvinyl alcohol suitable for forming the membrane. These compositions may often contain about 40 to 95 weight percent of the di(lower alkyl) sulfoxide, preferably about 50 to 80 weight percent, based on the total weight of the polyamide, polyvinyl alcohol and di(lower alkyl) sulfoxide. Although more or less flat membranes can be formed by, for instance, casting techniques in which the polyamide and polyvinyl alcohol are dissolved in the di(lower alkyl) sulfoxide, we highly prefer to form the membranes as hollow fibers. Such fibers made from the N-alkoxyalkyl polyamide-containing compositions have shown substantially better characteristics when used in the liquid barrier-complex-forming metal separation techniques than have fibers made from compositions in which the polyamide is not of the N-alkoxyalyl type. These fibers can be made by extrusion of the polyamide and polyvinyl alcohol mixture containing sufficient of the di(-lower alkyl) sulfoxide to form a composite of extrusion consistency. The fibers can generally be made from mixtures containing about 30 to 60, preferably about 40 to 50, weight percent of total polyamide and polyvinyl alcohol; and about 40 to 70, preferably about 50 to 60, weight percent of di(lower alkyl) sulfoxide. The mixtures often contain about 30 to 85, preferably about 40 to 70, weight percent polyamide; about 15 to 70, preferably about 30 to 60, weight percent polyvinyl alcohol; based on the total of these components.

A suitable process for forming the semi-permeable membrane from the mixture containing the polyamide, polyvinyl alcohol and di(lower alkyl) sulfoxide involves providing the mixture having the polymers in solution at an elevated temperature suitable for forming the membrane, and suitable temperatures are often in the range of about 60° to 150°C. Heating of the compositions under severe temperature-time conditions, e.g. 150°C. for 4 hours, can lead to reactions which discolor the mixture and may even cause the formation of unuseable dark brown, tarry masses. Excessive degradation should be avoided and we prefer that these compositions not be heated under conditions which cause any significant discoloration. The temperatures for extrusion may preferably be about 75° to 110°C. Higher solvent contents in the extrusion mixture may make the use of lower extrusion temperatures in this range desirable. The hot material can thus be extruded to form fibers having a hollow core surrounded by the membrane wall. During extrusion it is advantageous to pass a gas through the core of the hollow fibers to help cool the fibers and prevent the core of the fibers from closing.

After forming, the membrane can be dried or otherwise treated to remove the di(lower alkyl) sulfoxide. If the di(lower alkyl) sulfoxide is allowed to remain in the membrane in significant quantities, the membranes may be deleteriously affected over a period of time. For example, if the di(lower alkyl)sulfoxide, e.g. DMSO, remains in the fiber for extended periods, the fiber may become paste-like in appearance. If removal of the di(lower alkyl) sulfoxide from the fibers is postponed after forming, the fibers may be weaker than if the di(lower alkyl) sulfoxide had been withdrawn sooner. Thus we prefer to remove most, if not essentially all, of the di(lower alkyl) sulfoxide from the membrane more or less immediatedly after it is formed from the solution. A preferred method of removal is by drying at an elevated temperature, e.g. about 60° to 110°C., with shorter times being useable at higher temperatures.

Other methods for removing the di(lower alkyl) sulfoxide from the membrane may be employed. These techniques include solvent washing procedures in which the formed membrane is contacted at suitable temperatures with a liquid organic solvent for the di(lower alkyl) sulfoxide. The solvent and temperatures employed should not unduly dissolve or otherwise deleteriously affect the membrane, and washing temperatures from ambient to about 75°C. may suitably be employed. Among the solvents are the lower aliphatic ketones and lower alkanols such as methanol and isopropanol, and the low molecular weight paraffins or halogenated paraffins, e.g. the chlorinated paraffins such as chloroform.

In one fiber-forming procedure we have employed, the fibers are extruded into an acetone quench bath and soaked for a period of about 15 minutes to 2 hours. The fibers are then removed from the bath, dried, say at 75°C. for 2 hours.

The physical characteristics of the membranes, e.g. their strength and chemical resistance, may be enhanced by cross-linking the polyamide or the polyvinyl alcohol. Cross-linking of the polyamide can be accomplished by contact of the membranes with an organic or inorganic acidic catalyst such as a sulfonic acid of an aromatic hydrocarbon, mild nitric acid and the like. Such catalysts may, for instance, be naphthalene or toluene sulfonic acids, and cross-linking can be accomplished at elevated temperatures. During contact of the membrane with the acid catalyst as an aqueous solution, it is preferred that a water-soluble alkali metal salt be dissolved in the solution to maintain the integrity of the polyvinyl alcohol by reducing its tendency to dissolve in the aqueous catalyst solution. Cross-linking or other modification of the polymer composition may be effected before, during or after it is formed into the shape in which it is going to be used, but if this occurs before shaping, the modification should not be so extensive that the desired shaping may not be accomplished.

The properties, for instance, the strength and permeability, of the membrane fibers may be improved by drawing or stretching them and this can be accomplished at ambient or elevated temperatures. Suitable elevated temperatures are about 90° to 300°C., preferably about 125° to 200°C. The fibers may also be annealed at such temperatures, and the stretching and annealing may be accomplished simultaneously. The drawn fibers have a reduced overall diameter and thinner walls than before stretching whether at ambient or elevated temperature, and this treatment may preferably increase the length of the fibers by a factor of at least about 1.25 to say up to about 10 or more. This may preferably decrease the thickness of the walls to where they are less than about 0.5 of the thickness they had before stretching. Excessive stretching may adversely affect the strength and performance of the fibers and thus we prefer that their length not be increased by a factor of more than about 3. The stretching of the fibers is preferably accomplished when they are swollen with an aqueous or organic liquid, especially when stretching is conducted essentially at room or ambient temperature. The swelling agent is preferably water, but it may be an organic swelling agent, such as those listed below as swelling agents. The amount of swelling agent present during stretching is often a minor amount up to about 50 weight percent of the membrane, and preferably at least about 1 weight percent. The presence of the swelling agent may make stretching easier, e.g. require less force or lower temperatures for the same stretch. The swelling may preserve a place in the polymer structure for the complex-forming solution which is later incorporated in the membrane.

Stretching the fibers generally results in an increase in length proportional to the square root of the reduction in the internal and external diameters of the fibers. The rate of stretching and the time the fibers are at elevated temperatures can affect their properties. Reduction in diameter upon stretching the fibers can be a very rapid process. Thus applying a force of several hundred grams to a fiber at 200°F. for 0.1 of a minute may stretch the fiber adequately. Maintaining this force and temperature over several minutes has not greatly increased the amount of stretch. The maintenance of the elevated temperature may cause plastic flow within the fiber which tends to heal any voids produced during the stretching process. Thus, in our process we would prefer keeping the fiber at elevated temperatures for a longer time than is required just for stretching to benefit from the anealing or healing process. Annealing of the fibers either before, after or during stretching to assure elimination of small pinholes or pores in the fiber wall may be advantageous.

The materials which are employed to make the semipermeable film membranes of the present invention, have a film-forming polyamide as an essential component. The polyamide film-forming materials are generally known and have also been designated as nylons. The polymers are characterized by having a plurality of amide groups serving as recurring linkages between carbon chains in the product structure, and the polymers may be made by several procedures. Commonly, the polyamides are formed by reacting a polyamine and a dicarboxylic acid or its derivative such as an ester, especially a lower alkyl ester having, for instance, about 1 to 4 carbon atoms in the ester group. Other reactions which may be employed to form the polyamides include the self-condensation of monoamino, monocarboxylic acids and the reactions of cyclic lactams. In any event, the polyamide products contain recurring amide groups as an integral part of the principle polymer chain. The polyamides are described, for instance, in the Kirk-Othmer, *Encyclopedia of Chemical Technology*, Second Edition, Volume 16, beginning at page 1. Interscience Publishers, New York, 1968.

Among the typical structural formulas of the linear polyamides are H$_2$NRNH(COR'CONHRNH)$_n$COR'COOH and H$_2$NRCO(NHRCO)$_n$NHRCOOH, where R and R' represent primarily carbon-to-carbon chains between functional groups in the reactants, and n represents the degree of polymerization or the number of recurring groups in the polymer chain. The polyamides which can be used in this invention are generally solid at room temperature, and have a molecular weight which makes them suitable for forming the desired membranes, for example, about 8,000 to 20,000.

The carboxylic acids which may be used in forming the polyamides have an acyloxy group (—R—COO—) in their structure and the R member of this group is composed essentially of carbon and hydrogen and often contains about 6 to 12 carbon atoms. Such groups may be aliphatic, including cycloaliphatic, aromatic, or a mixed structure of such types, but the groups are preferably aliphatic and saturated with respect to carbon-to-carbon linkages. These R groups may preferably have straight chain carbon-to-carbon or normal structures. Among the useful dicarboxylic acid reactants are adipic acid, sebacic acid, azelaic acid, isophthalic acid, terephthalic acid, and the methyl esters of these acids.

The polyamines employed in making the polyamides generally have at least two non-tertiary, amino nitrogen atoms. These nitrogen atoms may be primary or secondary in configuration, although amines having at least two primary nitrogen atoms are preferred. The polyamines may also have both primary and secondary nitrogen atoms and the polyamines may contain tertiary nitrogen atoms. The preferred polyamine reactants have aliphatic, including cycloaliphatic, structures, and often have from 2 to 12 carbon atoms. Also, the preferred polyamines are saturated and have straight-chain structures, although branched-chain polyamines can be used. Among the useful polyamines are ethylene diamine, pentamethylene diamine, hexamethylene diamine, diethylene triamine, decamethylene diamine and their N-alkyl substituted derivatives, for instance, the lower alkyl derivatives which may have, for instance, 1 to 4 carbon atoms in the alkyl substituents.

Polymers which are preferably employed in this invention are those in which the film-forming polyamide is an N-alkoxyalkyl-substituted polyamide. Materials of this type are well known, as shown, for instance, by U.S. Pat. Nos. 2,430,910 and 2,430,923, which disclose N-alkoxymethyl polyamides made by the reaction of a polyamide polymer, formaldehyde and alcohol. Generally, at least about 5% of the amide groups of the polymer are substituted with alkoxyalkyl groups and such substitution may be up to about 60% or more. Preferably, this substitution is about 10 to 50% with the product being soluble in hot ethanol. Advantageously these polymers themselves are hydrophilic and absorb at least about 5 weight percent water when immersed in distilled water for one day at room temperature and pressure.

The alcohols employed in making the N-alkoxyalkyl polyamides are generally monohydric and may have, for instance, from 1 to about 18 or more carbon atoms. The lower alkanols are preferred reactants, especially the lower alkanols having 1 to 4 carbon atoms. Among the useful alcohols are methanol, propanols, butanols, oleyl alcohol, benzyl alcohol, lauryl alcohol and alcohol ethers, for instance, the alkyl ethers of ethylene glycol.

The N-alkyloxyalkyl polyamides which can be employed in the present invention to provide the desired semi-permeable membrane may be reacted with cross-linking agents, especially after the membranes are formed into the shape in which they will be used. For instance, the shaped membranes, e.g. as fibers, may be combined with the cross-linking agent and these materials may react under the influence of heat. The cross-linking agents which are useful after membrane formation may be, for example, polycarboxylic acids, especially the dicarboxylic and tricarboxylic acids which may have, for instance, from 2 to about 12 carbon atoms. Useful acids include oxalic acid, citric acid, maleic acid, and the like. The water-soluble, alkali metal salts of the polycarboxylic acids, e.g. sodium citrate, may be present in the composition during formation of the membrane. Upon acidifying the polymers, the corresponding carboxylic acid is formed and may serve to cross-link the N-alkoxyalkyl polyamide. If a polycarboxylic acid cross-linking agent be present in an extrudable mixture held at an elevated temperature desired for extrusion, the cross-linking reaction may proceed to an undesirable extent and make the mixture non-extrudable. Cross-linking may provide membranes with improved permeability when the polyamide is swollen with water at the time the cross-linking reaction occurs. Swelling of the membrane may also be accomplished with organic liquids such as ketones, and monohydric and polyhydric alcohols, e.g. alkanols such as propanol, butanol and the like, glycols, glycerol, monoalkyl-terminated glycols or glycol ethers, and the like. A minor amount, say at least about 3 weight percent, of the swelling agent may be in the membrane when cross-linking takes place, preferably this is about 5 to 100% based on the weight of the membrane.

The nylon component of the membranes of this invention may be grafted polymers which may preferably be produced by forming a mixture of nylon, the monomer to be grafted and a free-radical graft polymerization catalyst, and proceeding with the grafting reaction. The solid product can be separated by filtration, washing and drying. The membrane can be made from a solution or other mixture containing the grafted copolymer. In another method one may first form a membrane with the nylon and then contact the membrane with the monomer and catalyst in solution to form the graft copolymer. The monomers which can be grafted to the nylon may be alphaolefinic, usually containing from 2 to about 12 carbon atoms, and having one or more hydrophilic functional groups, e.g., active polymerizable vinyl monomers. The monomers may contain more than 12 atoms, especially where the monomer contains an abundance of hydrophilic functional groups. The monomers often consist essentially of carbon, hydrogen, and oxygen, with or without nitrogen and may, but not necessarily, be water-soluble. The addition-polymerizable monomers which may be used include the alcohols, esters, sulfamates, phosphonates, carboxylates and the like, and especially the vinyl alcohols, vinyl esters such as the lower alkyl esters of acrylic and methacrylic acids, vinyl ethers, acrylamides, and the like. The hydrophilic monomer may be employed in an amount sufficient to enhance the hydrophilic property of the polyamide, and may, for instance, be up to about 90 weight percent or somewhat more of the composition, based on the total polyamide and monomer. The combined or grafted monomer component is often at least about 30 weight percent on this basis, to impart more significant properties to the resulting composition. Preferably, the grafted monomer is about 40 to about 75 weight percent of the total weight of the copolymer. The chain length of the polymer grafts to the nylon may be up to about ten or twenty or more monomer lengths, and the grafts may be formed with, for instance, up to about 15 percent of the total nitrogen atoms of the polyamide, often with at least about 1 up to about 5 or 10 percent of the total polyamide nitrogen atoms.

The polyvinyl alcohols employed in the present invention are essentially water-soluble materials and many of these are commercially available. The molecular weights of these polymers are often at least about 1,000. The polyvinyl alcohol may be cross-linked especially after the membrane is in the shape in which it will be used. The presence of the cross-linked polyvinyl alcohol may increase the strength of the membrane and increase the resistance of the membrane to loss of polyvinyl alcohol by leaching during use. The film membranes may be formed by dissolving the nylon, polyvinyl alcohol and a cross-linking polycarboxylic acid in a solvent such as a di(lower alkyl) sulfoxide. A film can be formed from the solution and the polyvinyl alcohol cross-linked by reaction with the polycarboxylic acid under the influence of heat. The cross-linking agents used may be polycarboxylic acids, preferably those having from 2 to about 12 carbon atoms. The useful acids are preferably water-soluble; and among the polycarboxylic acids, the diacids and triacids, and especially the saturated diacids, are preferred. Included among these are the aliphatic polycarboxylic acids, including oxalic acid, citric acid, maleic acid, malonic acid, and the like. The polyvinyl alcohol may also be cross-linked by reaction with formaldehyde, e.g. by immersing the membrane in an aqueous bath containing 10% $Na_2SO_4$ and 3% formaldehyde, at 50°C. for 1 to 3 hours. In cross-linking the polyvinyl alcohol, the shaped membrane may be combined with the cross-linking agent and the composite can be subjected to heat treatment to effect cross-linking. The temperatures used during cross-linking should be sufficient to enhance the cross-linking reaction to the desired degree, but not such as to affect the membrane detrimentally. The amount of cross-linking agent used may depend upon which agent is chosen, the amount and molecular weight of the polyvinyl alcohol present in the mixture, and the degree of completion of the cross-linking reaction desired. The amount of cross-linking agent generally used may be from about 1 to about 100 weight percent, and preferably from about 5 to about 60 weight percent, based on the weight of the polyvinyl alcohol.

The di(lower alkyl) sulfoxides which may be used to form the membranes of this invention are essentially liquid at ambient temperatures of about 20° to 25°C. Each alkyl group of these materials often has up to about 3 carbon atoms and thus these sulfoxides include dimethyl sulfoxide, diethyl sulfoxide, dipropyl sulfoxide and the like. The use of dimethyl sulfoxide (DMSO) is preferred in this invention.

The semi-permeable membranes of this invention can be used to separate chemicals from various mixtures, and in this use the membranes are in contact with an aqueous liquid barrier solution which contains complex-forming metal components as ions in solution. The metals which may serve in the form of metal-containing cations to separate one or more components from a mixture through the formation of metal complexes of desired properties, include, for instance, the transition metals of the Periodic Chart of Elements having atomic numbers above 20. Included in these metals are those of the first transition series having atomic numbers from 21 to 29, such as chromium, copper, especially the cuprous ion, manganese and the iron group metals, e.g., nickel and iron. Others of the useful complex-forming metals are in the second and third transition series, i.e., having atomic numbers from 39 to 47 or 57 to 79, as well as mercury, particularly as the mercurous ion. Thus, there may be employed noble metals such as silver, gold and the platinum group, among which are platinum, palladium, rhodium, ruthenium and osmium. The useful base metals of the second and third transition series include, for example, molybdenum, tungsten, rhenium and the like. Various combinations of these complex-forming metals may also be employed, either in the presence or absence of other non-metal or non-complexing metal components.

The metal is provided in the membrane or in aqueous liquid barrier of the separation system in a form which is soluble in this liquid. Thus, the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes when the membrane is in contact with water. The metal salts should not react with any components of the chemical feedstock used in the separation procedure to form an insoluble material which could block the membrane or otherwise prevent the separation of a component from the feedstock. Also, in a given system, the metal is selected so that the complex will readily form, and yet be sufficiently unstable, so that the complex will decompose and the dissociated material leave the liquid barrier, thereby providing a greater concentration of the material to be separated from the exit side of the membrane than is in the feed. The concentration of the metal ions in the membrane or liquid barrier may be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar and is preferably about 0.5 to 12 molar. Advantageously, the solution is less than saturated with respect to the complex-forming metal ions to insure that essentially all of the metal stays in solution, thereby avoiding any tendency to plug the film membrane and destroy its permeability characteristics.

When the complexing ions in the liquid barrier employed include cuprous ions, ammonium ions can be used to provide copper ammonium complex ions which are active to form a complex with the material to be separated by the use of the membrane. These may preferably be supplied about equimolar amounts of cuprous and ammonium ions, although either type of ions may be in excess. The ammonium ions can be provided in various convenient ways, preferably as an acid salt such as ammonium chloride or as ammonium hydroxide or ammonium carbonate. In order to enhance the selectivity of the copper ammonium ion complex in the separation of this invention, the membrane and thus the liquid barrier solution may be made more acidic, by, for instance, providing a water-soluble acid such as a mineral acid, especially hydrochloric acid in the membrane or liquid barrier solution. Preferably, the pH of the liquid barrier in this form of the process is below about 5 with the acid in the solution. Since silver may form undesirable acetylides with acetylenes, the copper ammonium complex may be a more attractive complexing agent when it is desired to use the membrane to separate acetylenes from various mixtures.

Instead of supplying only a noble metal for complexing the material to be separated, one may also employ mixtures of noble metal and other cation-providing materials. A portion of the noble metal may be replaced by non-noble metal or ammonium components. Accordingly, the total of such ion-forming materials in the membrane or in the liquid barrier may be composed of a minor or major amount of either the noble metal or the non-noble metal, ammonium or other components. Mixtures having a major amount of the non-noble metal, ammonium or other cation-providing materials not containing a noble metal will generally be less expensive, and, accordingly, the noble metal may be as little as about 10 molar percent or less of the total cation-providing material in the mixture. To reduce expenses, at least about 10 molar percent, preferably at least about 50 molar percent, on a cation basis, of the total cation-providing material may be other than noble metal. The non-noble or base metals are preferably of Groups II to VIII of the Periodic Chart of Elements, and especially those in the fourth and fifth periods, aluminum and magnesium. Zinc and cupric ions are preferred ones among these non-noble or base metal components. The various metals may be provided in the liquid barrier or membrane in the form of any suitable compound, such as the acid salt forms mentioned above with respect to the noble metals.

The amount of water in the liquid barrier employed in the separation process may be a minor portion of the liquid phase, but preferably is a major portion or even essentially all of the liquid, on a metal salt-free basis. Thus, small or minor amounts of water, say as little as about 5 weight percent, on a salt-free basis in the liquid phase may serve to provide significant transport for the material to be separated across the liquid barrier. Any other liquid present in the barrier is preferably water-miscible and should be chosen as not to have a substantial deleterious effect on the separation to be accomplished. The liquid barrier may also contain a hygroscopic agent, e.g., in a minor amount, to improve the wetting or hydrophilic properties of the liquid and provide better contact with the feed gas.

The amount of complex-forming metal when incorporated in the semi-permeable membrane may vary considerably, but is sufficient to accomplish the desired separation. Often, this is a minor amount, say, about 1 to 50 weight percent, of the weight of the membrane on a non-aqueous basis, preferably about 5 to 25 weight percent. A suitable procedure for placing the solution of complex-forming metal in the semi-permeable membrane is by contacting it with the solution and exerting a differential pressure across the solution and membrane. Thus, the pressure behind the solution is greater than that on the opposite side of the membrane, and as a result, the solution is forced into the membrane under pressure. Conveniently, the pressure on the solution is above atmospheric, and the opposite side of the membrane is essentially at atmospheric pressure. The pressure differential need not be large, for instance, it may only be at least about 5 or 10 psi, and it should not be so great that the membrane is ruptured. This procedure could also be used to reactivate membranes which have been used to the point where they have lost selectivity.

The membrane, whether containing the complex-forming metal or not, may be handled and transported in an essentially non-aqueous form or with some water therein, for instance, an insufficient amount of water to be effective in the separation. In such case, water could be added to the membrane to give a membrane bearing sufficient water to be useful in performing the separation process of the invention. During use of the membrane, the amount of water present is preferably less than that which gives a substantial distinct or separate aqueous phase on the feed inlet side of the membrane. The film membrane can be wetted initially, and if it has a tendency to dry during use, additional water can be placed in the membrane while it is used on-stream in the separation, for instance, by inclusion of moisture in the gaseous feed charged to the system. Alternatively, but less advantageously, the operation can be stopped for addition of water to the membrane. The water could be added at intervals by stopping the feeding of the gaseous mixture to the system, and charging water to the membrane at such times. In any event, care should be taken to insure that the membrane during use is not so dry that it will exhibit non-selective permeability to the material to be separated from the feed, and will thereby not serve to separate a product having an increased concentration of the desired ingredient.

The membranes of this invention are of the essentially water-insoluble, hydrophilic, semi-permeable type. In the absence of contact between the membrane and the liquid barrier containing the complex-forming ions, the membrane is generally not adequately selective with respect to the passage of or permeation by the material to be separated to perform the desired separation at the desired rate. Often, the membrane is permeable to essentially all of the components in the gaseous feedstock used. However, by having the membrane in contact with sufficient aqueous liquid to form a barrier, the simple diffusion of gas through the membrane is reduced or prevented, and the components of the feed stream must, therefore, traverse the membrane primarily by becoming part of, and then being separated from, the aqueous liquid phase in contact with, preferably essentially entirely within, the membrane. Thus, in the absence of the complexing metal ion in the aqueous medium, there could be a slight separation effected by the use of water as the liquid medium since the individual components in the gas may exhibit differing solubilities in water. In the process, however, the selectivity of the separation is greatly increased due to the presence of the complexforming metal ions in the aqueous barrier medium. Also, during use in the process, the system has a sufficient amount of the aqueous medium so that adequate metal ions are in solution, or at least react as if they are, to perform the desired separation. The membranes are generally sufficiently hydrophilic to hold the liquid barrier solution at least partly within the membrane. This hydrophilic property is present in the membrane due to the character of both the polyamide or nylon polymer and the polyvinyl alcohol. The polyvinyl alcohol is a hydrophilic agent and other hydrophilic agents may also be present in the membrane. Non-polymeric hydrophilic agents which may be added include the polyhydric alcohols such as ethylene glycol, glycerol, and propylene glycol. The film membrane may be considered sufficiently hydrophilic to be useful if it absorbs at least about 5, preferably at least about 10, weight percent of water when immersed in distilled water for 1 day at room temperature and pressure.

The semi-permeable membranes made by the procedure of the present invention may be employed, to separate, for instance, one or more unsaturated hydrocarbons by the liquid barrier-complex-forming technique in which the barrier is in contact with the membrane. Although the separated products thus provided may be quite pure materials, for instance, of greater than 99% purity, the separation procedure may be used merely to provide a significant increase in the concentration of a given material in a mixture with other components of the feedstock.

The process can be employed to separate various aliphatically-unsaturated hydrocarbons from other ingredients of the feed mixture providing at least one of the aliphatically-unsaturated hydrocarbons exhibits a complexing rate or transfer rate across the liquid barrier that is greater than at least one other dissimilar or different component of the feedstock. Quite advantageously, the system can be used to separate aliphatically-unsaturated hydrocarbons from other hydrocarbons which may be aliphatically-saturated or aliphatically-unsaturated, or from non-hydrocarbon materials, including fixed gases such as hydrogen. The feed mixture may thus contain one or more paraffins, including cycloparaffins, mono- or polyolefins, which may be cyclic or acyclic, and acetylenes or alkynes, and the mixture may include aromatics having such aliphatic configurations in a portion of their structure. Often, the feed mixture contains one or more other hydrocarbons having the same number of carbon atoms as the unsaturated hydrocarbon to be separated or only a one carbon atom difference. Among the materials which may be separated according to this invention are ethylene, propylene, butenes, butadiene, isoprene, acetylene and the like.

In the method, the mixture containing the material to be separated may be essentially in the gaseous or vapor phase when in contact with the liquid barrier having dissolved therein one or more metal ions which form a complex with the material to be separated. The liquid barrier is preferably essentially entirely within the semi-permeable membrane which may be permeable to the mixture in the absence of the liquid barrier. The membrane can be said to immobilize the liquid barrier within the membrane, and the liquid does not pass from the membrane to an excessive extent under the conditions of operation. The membrane is, however, selectively permeable in the presence of the liquid barrier to the component of the feedstock to be separated. Since there is little, if any, passage for the feedstock across the separation zone except by becoming part of or reacting with the liquid barrier, and this liquid barrier controls the selectivity of the liquid barrier-semipermeable membrane combination.

The liquid barrier contains sufficient water and soluble metal ions to form a suitable complex with at least one component of the feed subjected to the separation procedure. The metal ions readily form the complex upon contact with the feed, and, in addition, the complex dissociates back to the metal ion and a component of the complex which was in feed, under the conditions which exist on the discharge side of the liquid barrier and semi-permeable membrane as employed in the process. The released feed component exits the discharge side of the membrane and can be removed from the vicinity of the barrier and its supporting structure as by a sweep gas or through the effect of vacuum on this side of the barrier. Thus the metal complex forms and is decomposed in the complex metal ion-containing liquid barrier, and, as a result, the material passing through the barrier is more concentrated with respect to at least one component present in the feed stream.

Often, the reactivity of aliphatically-unsaturated hydrocarbons with the complexing metal ions in their order of decreasing activity goes from acetylenes or dienes to monoolefins, the aliphatically-saturated hydrocarbons and other materials present being essentially non-reactive. Also, different reactivities may be exhibited among the various members of a given type of aliphatically-unsaturated hydrocarbon. The process can thus be used to separate paraffins from monoolefins, diolefins or acetylenes; diolefins from monoolefins; or acetylenes from paraffins, monoolefins or diolefins; as well as to separate a given aliphatically-unsaturated hydrocarbon from another of such materials in its class where the members have differing complexing rates with or transport rates across the liquid barrier. The feed need only contain a small amount of aliphatically-unsaturated hydrocarbon, as long as the amount is sufficient so that the unsaturated material to be separated selectively reacts with the metal complex ions to a significant extent, and thus at least one other component of the feed is less reactive or non-reactive with the complexforming metal ions.

The aliphatically-unsaturated materials of most interest with regard to separation have 2 to about 8 carbon atoms, preferably 2 to 4 carbon atoms. The separation of aliphatically-unsaturated materials from admixtures containing other gaseous materials, such as the separation of ethylene or propylene from admixtures with other normally gaseous materials, e.g., one or more of ethane, propane, and methane and hydrogen, is of particular importance. Frequently, such feed mixtures for the process contain about 1 to 50 weight percent ethylene, about 0 to 50 weight percent ethane and about 0 to 50 weight percent methane. Another process that may be of special significance is the separation from ethylene of minor amounts of acetylene.

The partial pressure of the aliphatically-unsaturated component of the feed at the input side of the liquid barrier used in the separation is greater than the partial pressure of this unsaturated hydrocarbon on the discharge or exit side of the liquid barrier-semi-permeable membrane composite. This pressure drop of the unsaturated hydrocarbon to be separated may often be at least about 0.5 pound per square inch, and is preferably at least about 20 psi, although the pressure drop should not be so great that the liquid barrier is ruptured or otherwise deleteriously affected to a significant extent. Conveniently, the total pressure of the feed is up to about 1000 pounds per square inch. The discharge partial pressure of the unsaturated hydrocarbon can preferably be controlled by subjecting the exit side of the liquid barrier to the action of a sweep gas that may be essentially inert to forming a complex with the metal ions in solution in the liquid barrier. The sweep gas picks up the discharged aliphatically-unsaturated components, and the sweep gas may be selected so that it can be readily separated from the aliphatically-unsaturated hydrocarbon material if that be necessary for the subsequent use of the unsaturated hydrocarbon. Unless a reaction with the separated hydrocarbon is desired, the sweep gas should be relatively inert therewith and may be, for instance, butane, carbon dioxide or the like.

The temperature across the liquid barrier-semipermeable membrane composite employed in the separation procedure can be essentially constant or it may vary, and decomposition of the metal complex can be effected primarily by the drop in partial pressure of the material to be separated on the exit side of the liquid barrier compared with its partial pressure on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often, the temperature may be up to about 100°C., and elevated temperatures may even be desired to put the feedstock in the gaseous or vapor phase. Neither the temperature nor the pressure used should, however, be such as to destroy the difference in transport rate across the liquid barrier, semi-permeable film composite of the material whose separation is sought, compared with that of the other components of the feed. The conditions should also not be such that physical disruption of the liquid barrier or any other significant malfunction results.

This invention will be further illustrated by the following specific examples.

applying a controlled stress to the fibers while heating them to 150°–200°F. The stretched fibers were crosslinked by immersion in a 3% p-toluenesulfonic acid in 10% aqueous sodium sulfate bath for 90 minutes at 50°–60°C. The fibers were then washed repeatedly with water to remove the salt from them and allowed to dry.

The ends of three of these fibers were then potted together in a 2 1/2 inches by 1/4 inch O.D. stainless steel tube with Armstrong's C-4 epoxy resin. The resin was cured with Armstrong's Activator "D" by heating the resin-activator mixture at 80°C. for 60 minutes. The other ends of the fibers were potted similarly in a different tube. Potting was done in such a manner such that removal of a small amount of the potting compound could be done to expose open ends of each of the fibers.

The potted fiber bundle was allowed to soak for 16 hours in a 6M $AgNO_3$ solution. The fiber bundle was then assembled into a hollow fiber test cell in which the fibers had a total membrane area of 23.4 cm.$^2$. This cell was then supplied with a pressurized 10 ml./min. stream of a mixture of ethylene, ethane, and methane. The feed was supplied to the outside of the fibers and was humidified by bubbling it through water at 145°F. before reaching the cell. The inside of the fibers was continually purged with a 10 ml./min. stream of helium which picked up any material which permeated the fibers. A gas chromatographic analysis of the purge stream was used to determine the permeation rate of and selectivity to ethylene of the fibers. As can be seen from Table I the unit successfully separated ethylene from the feed mixture.

Table I

| Pressure, PSIG | Permeate Composition (wt. %, He-free) | | | S* | Permeation Rate ml./cm.$^2$-min. |
|---|---|---|---|---|---|
| | Methane | Ethylene | Ethane | | |
| (Feed | 18.1 | 50.2 | 31.7) | — | — |
| 5 | 0.15 | 99.85 | 0 | 659 | 8.59 × 10$^{-4}$ |
| 10 | 0.12 | 99.88 | 0 | 840 | 1.22 × 10$^{-3}$ |
| 20 | 0.15 | 99.73 | 0.12 | 351 | 1.70 × 10$^{-3}$ |

$$*S = \text{Selectivity} = \left(\frac{\text{Methane}+\text{Ethane}}{\text{Ethylene}}\right)_{feed} \times \left(\frac{\text{Ethylene}}{\text{Methane}+\text{Ethane}}\right)_{permeate}$$

EXAMPLE 1

A blend of 60 gms. of formaldehyde-alcohol modified 6:6 nylon (BCI-819, Belding Chemical Industries), 40 gms. of polyvinyl alcohol (determined by gel permeation chromatography to have a number average molecular weight of 12,360, 0%–0.5% acetate) and 120 ml. of DMSO was made as an extrusion mix, by first mixing the dry polymers and then adding the DMSO. The resulting slurry was heated with vigorous stirring in an extruder feed tank at 250°F. for 1.5 hours to melt the polymers and degas the blend for extrusion. Extrusion of the mixture was conducted under a nitrogen pressure between 200 and 1000 on the feed tank and with the extruder head being heated at 170°F. Hollow fibers of the polymer blend were formed through an annular die having an opening of 0.070 inch O.D. During extrusion, air or nitrogen was blown through the center of the fiber by passage through a hypodermic needle (O.D. about ½ of that of the die opening) extending into the die opening. After extrusion the fibers were stretched by 25 to 75% of their original length by

EXAMPLE 2

A blend of BCI-819 nylon, polyvinyl alcohol and DMSO was formed and extruded as described in Example 1. The hollow fibers from the extruder were quenched in a 5% $Na_2SO_4$ aqueous bath and dried overnight at room temperature. The fibers were 0.050 inch in O.D., melted at 170°C. and softened at 110°C. It was considered that temperatures between 110° and 160°C. would be suitable for annealing and drawing the fibers.

The fibers were annealed and drawn by suspending them in an oven with a weight on the bottom of each fiber. The length and O.D. of the fibers were recorded before and after annealing (see Table II). The results show that annealing alone did not reduce the O.D. Fiber samples 1, 2 and 3 were stretched with 2.9 gram weights and the O.D. was unchanged. When greater weights were used, the O.D. of the fibers was reduced.

Table II

DRAWING AND ANNEALING OF NYLON-POLYVINYL ALCOHOL FIBERS

| Fiber Sample No. | Drawing and Annealing Conditions | | | Fiber Before Drawing | | Fiber After Drawing | |
|---|---|---|---|---|---|---|---|
| | Temp., °C. | Time, min. | Weight, gms. | Length, in. | O.D., in. | Length, in. | O.D., in. |
| 1 | 140 | 15 | 2.9 | 5 | .060 | 4.5 | .060 |
| 2 | 150 | 15 | 2.9 | 5 | .060 | 4.5 | .055 |
| 3 | 160 | 15 | 2.9 | 5 | .050 | 4.4 | .050 |
| 4 | 150 | 5 | 35.2 | 5 | .050 | 7.4 | .040 |
| 5 | 120 | 5 | 35.2 | 5 | .050 | 5.5 | .050 |
| 6 | 120 | 10 | 98 | 5 | .055 | 8.0 | .040 |
| 7 | 130 | 10 | 98 | 4 | .050 | 6.6 | .035 |
| 8 | 130 | 10 | 147 | 4 | .060 | 9.3 | .032 |
| 9 | 130 | 10 | 147 | 3 | .060 | 8.8 | .028 |

Annealing decreased the porosity of the fibers. This effect is evident by examining the fiber both before and after annealing. Before annealing, the fiber is milky white and characteristic of a material having very small holes. After annealing, the fiber is clear indicating that these holes have been annealed out.

EXAMPLE 3

A casting solution was prepared by dissolving 12.5 gms. of Belding BCI-819 nylon and 7.5 gms. of the same polyvinyl alcohol as employed in Example 1, in 180 ml. of dimethyl sulfoxide. The solution was heated to 75°C. to dissolve all the polymer. A film of this solution was cast onto a clean glass plate with a 6 mil Bird applicator, was dried in an oven at 75°C. for 30 min., and then was crosslinked in an aqueous bath containing 10% $Na_2SO_4$ and 3% p-toluene sulfonic acid, at 50°C. for 30 minutes.

In this procedure the temperature of the crosslinking bath seemed significant. With the bath at 40°C., the resultant films were frequently porous, and at higher temperatures, about 75°C., there was a tendency to reduce the permeability of the films. Therefore the optimum temperature was in the range of about 50° to 60°C. This optimum could vary with the composition of the casting solution and with the temperature and time for drying the film.

A large number of tests were performed with the crosslinked film, and the one described here is typical of the performance of the crosslinked films in separating ethylene. The film was loaded into a glass test cell that was divided into upper and lower compartments by locating the semi-permeable film membrane horizontally across the cell. The effective cell internal cross-sectional are that was fully covered by the film had an area of 3.8 cm². The main body of the cell had a height of 40 mm. and a gas outlet at each end. A feed inlet inlet tube entered the upper end of the cell and opened about 10 mm. above the membrane and a sweep gas inlet tube entered the lower end of the cell and opened about 0.25 mm. below the membrane. The feed was charged into the upper portion of the cell, and the exhaust or raffinate components of the gas left the cell by the upper outlet. The feed rate was considered to be sufficient to maintain a constant gas composition on the inlet side of the membrane. A sweep gas contacted the lower surface of the membrane, picked-up the materials leaving the membrane and then exited the cell by the lower outlet as a product stream. The product was analyzed by gas chromatography. Then 0.3 ml. of 6 N aqueous $AgNO_3$ was placed on top of the film. During the operation to separate ethylene the pressure drop across the membrane slowly forced the $AgNO_3$ solution into the polymer. A feed consisting of methane, ethane, and ethylene was supplied to the membrane at 40 psig. and a bypass rate of 10 ml./min. A $N_2$ purge swept the reverse side of the membrane and pickedup the permeate. Gas chromatography of the $N_2$ sweep effluent determined both the composition and the permeation rate of the permeate. The results are given in Table V and show that the membrane performed well.

Table III

Performance of Nylon – PVA Crosslinked Film

| | Permeation Rate, ml./cm²min. | Permeate Composition, Wt.% ($N_2$-free) | | |
|---|---|---|---|---|
| | | $CH_4$ | $C_2H_4$ | $C_2H_6$ |
| Feed | — | 21.8 | 35.6 | 42.6 |
| Permeate | .084 | .076 | 99.2 | .090 |

EXAMPLE 4

A polymer casting solution was prepared by dissolving 5 grams of formaldehyde-methanol modified 6:6 nylon (BCI-829, Belding Chemical Industries), and 5 grams of water-soluble polyvinyl alcohol (similar to that in Example 1) in 90 ml. of DMSO. This solution can be made at 70° to 80°C., and after it is clear, it is cooled to room temperature. Two grams of $AgNO_3$ were placed in a blackened, 2 ounce jar and to this was added 42 grams of the nylon-polyvinyl alcohol solution. These materials were mixed until all of the $AgNO_3$ was dissolved in the solution. A film was prepared by casting this solution onto a clean glass plate with a 6 mil. Bird applicator. The film was dried in an oven at 50°C. for 1 hour. Films can also be made by this procedure from the nylon and polyvinyl alcohol-containing solution in the absence of any complex-forming metal. Such films can be impregnated with the complex-forming metal for use in separating olefins.

EXAMPLE 5

The film made in accordance with Example 4 was tested in an apparatus similar to that described in Example 3. The hydrocarbon feedstock was 17.4% $CH_4$, 49.6% $C_2H_4$, and 32.8% $C_2H_6$ and was supplied to the membrane at 40 psig. at a by-pass rate of 10 ml./min. The feed was bubbled through a water scrubber set at 200°F. to humidify the membrane. The cell was at ambient temperature. A nitrogen gas purge swept the reverse side of the membrane and picked up the gas permeating through the membrane. Gas chromatography was used to determine the composition of the permeate, as well as the permeation rate. The permeation rate was 0.087 ml./cm.² min. and the permeate analyzed 97.29% $C_2H_4$, 1.92% $C_2H_6$ and 0.78% $CH_4$. The system thus exhibited both good selectivity and a high gas permeation rate in the separation of ethylene.

EXAMPLE 6

A membrane was made by dissolving 5 parts by weight of Elvamide 8061 nylon resin (DuPont), which is an alcohol-soluble polyamide, and 0.50 part by weight of water-soluble polyvinyl alcohol similar to that in Example 1, in 94.5 parts by weight of DMSO. The mixture was warmed to dissolve the polymer, and cast onto a glass plate using a 6 mil Bird applicator. The resulting hydrophilic film was dried for 30 minutes in an oven at 45°C. The film was then quenched in distilled water and kept immersed for 20 hours. The film was dried with filter paper, and soaked in a 6N $AgNO_3$ solution for two hours. The film was removed from the solution, dried and then tested in an apparatus similar to that described in Example 3.

The hydrocarbon feed used in the test was saturated with water vapor and charged to the cell at 10 psig and a rate of 25 ml./min. Nitrogen was used as the sweep gas to remove the permeate. The results were as follows:

Table IV

|          | % $CH_4$ | % $C_2H_4$ | % $C_2H_6$ | % $C_3H_6$ | % Olefins |
|----------|----------|------------|------------|------------|-----------|
| Feed     | 13.39    | 31.80      | 22.59      | 32.22      | 64.02     |
| Permeate | 2.90     | 52.25      | 4.79       | 40.07      | 92.32     |

The selectivity factor for olefins obtained in the test was 6.75.

EXAMPLE 7

A membrane was made by dissolving 27 grams of Elvamide 8061 nylon resin (DuPont) and 3 grams of water-soluble polyvinyl alcohol similar to that in Example 1, in 120 ml. of DMSO. The mixture was warmed to 200°F. to dissolve the polymer, and then cast onto a glass plate using a 6 mil Bird applicator. The resulting film was partially dried for a minute in a vacuum oven at 85°C., 15 inches of vacuum and 500 ml./min. of air. The film was then quenched in a 0.5% $NaNO_3$ brine. The hydrophilic film was removed from the brine, dried and then tested in an apparatus similar to that described in Example 3.

In the test, 0.5 ml. of 5N $AgNO_3$ was placed on top of the membrane. The cell was closed and pressurized on the feed side to 20 psig. After several hours the $AgNO_3$ solution had been forced into the film. The hydrocarbon feed used in the test was humidified with water vapor and charged to the cell at 10 psig initially and then at 20 psig, all at a rate of 25 ml./min. Humidified nitrogen was used as the sweep gas to remove the permeate. The results were as follows:

Table V

| Time Since Start-up (Min.) | Pressure (psig) | Permeation Rate (ml./cm.²min.) | Composition of Permeate, Wt.% ($N_2$-free) | | |
|---|---|---|---|---|---|
| | | | % $CH_4$ | % $C_2H_4$ | % $C_2H_6$ |
| (Feed | — | — | 18.8 | 50.8 | 30.4) |
| 25 | 10 | .0018 | .085 | 99.51 | .407 |
| 36 | 10 | .0042 | .228 | 99.37 | .397 |
| 63 | 10 | .0057 | .086 | 99.82 | .097 |
| 90 | 10 | .0043 | .130 | 99.78 | .094 |
| 97 | 10 | .0050 | .068 | 99.87 | .065 |
| 114 | 20 | .0143 | .190 | 99.69 | .120 |
| 160 | 20 | .0099 | .047 | 99.92 | .031 |
| 167 | 20 | .0100 | .084 | 99.83 | .083 |
| 180 | 20 | .0108 | .064 | 99.88 | .054 |
| 200 | 20 | .0098 | .149 | 99.65 | .198 |

It is claimed:

1. An extrusible composition which is of extrusion consistency at temperatures in the range of about 60° to 150°C. and suitable for forming a semi-permeable membrane, consisting essentially of polymer and di(-lower alkyl) sulfoxide solvent, said polymer consisting essentially of nylon polymer and sufficient water-soluble polyvinyl alcohol to enhance the hydrophilic properties of the nylon polymer, the amount of said solvent present providing an intimate, compatible mixture of said nylon polymer and polyvinyl alcohol having said extrusion consistency, and the amounts of nylon polymer and polyvinyl alcohol present being such to provide upon extrusion a hydrophilic, semi-permeable membrane.

2. A composition of claim 1 in which the di(lower alkyl) sulfoxide is dimethyl sulfoxide.

3. A composition of claim 2 in which the polymer has about 30 to 90% nylon polymer and about 10 to 70% polyvinyl alcohol based on their total.

4. A composition of claim 3 in which the di(lower alkyl) sulfoxide is about 40 to 95%, based on the weight of the nylon polymer, polyvinyl alcohol and di(lower alkyl), sulfoxide.

5. A composition of claim 1 in which the nylon polymer is an N-alkoxyalkyl polyamide.

6. A composition of claim 5 in which the nylon polymer is an N-methoxymethyl polyamide.

7. A composition of claim 6 in which the polymer has about 40 to 70% nylon polymer and about 30 to 60% polyvinyl alcohol based on their total.

8. A composition of claim 7 in which the di(lower alkyl) sulfoxide is about 40 to 70%, based on the weight of the nylon polymer, polyvinyl alcohol and di(lower alkyl), sulfoxide.

9. A composition of claim 8 in which the di(lower alkyl) sulfoxide is dimethyl sulfoxide.

10. A water-insoluble, hydrophilic semi-permeable membrane consisting essentially of cross-linked N-alkoxyalkyl polyamide and sufficient water-soluble polyvinyl alcohol to enhance the hydrophilic properties of the polyamide.

11. A membrane of claim 10 in which the membrane is in hollow fiber form.

12. A membrane of claim 10 having about 30 to 90% of N-alkoxyalkyl polyamide and about 10 to 70% of water-soluble polyvinyl alcohol based on their total.

13. A membrane of claim 12 in which the polyamide is an N-methoxymethyl polyamide.

14. A membrane of claim 12 in which the membrane is in hollow fiber form.

15. A membrane of claim 14 in which the N-alkoxyalkyl polyamide is about 40 to 70% and the water-soluble polyvinyl alcohol is about 30 to 60% based on their total.

16. A membrane of claim 15 in which the polyamide is an N-methoxymethyl polyamide.

17. A membrane of claim 10 in which the N-alkoxyalkyl polyamide is about 40 to 70% and the water-soluble polyvinyl alcohol is about 30 to 60% based on their total.

18. A water-insoluble, hydrophilic, semi-permeable membrane composition consisting essentially of N-alkoxyalkyl polyamide, sufficient water-soluble polyvinyl alcohol to enhance the hydrophilic properties of the polyamide, and a metal component which, in the presence of water, provides cations that are capable of forming a water-soluble complex with aliphatically-unsaturated hydrocarbons.

19. A composition of claim 18 in which the metal is noble metal.

20. A composition of claim 19 in which the metal is silver.

21. A composition of claim 20 in which the composition has about 30 to 90% nylon polymer and about 10 to 70% water-soluble polyvinyl alcohol based on their total.

22. A composition of claim 18 having about 40 to 70% N-alkoxyalkyl polyamide and about 30 to 60% of water-soluble polyvinyl alcohol and the membrane is in hollow fiber form.

23. A composition of claim 22 in which the polyamide is an N-methoxymethyl polyamide.

24. A composition of claim 23 in which the metal is noble metal.

25. A composition of claim 24 in which the noble metal is silver.

26. A composition of claim 25 in which the polyamide is cross-linked by acid catalysis.

27. A composition suitable for forming a hydrophilic, semi-permeable membrane by extrusion which comprises about 40 to 70% of di(lower alkyl) sulfoxide solvent, and about 30 to 60% of polymer, said polymer being comprised of about 40 to 70% nylon polymer and about 30 to 60% of water-soluble polyvinyl alcohol.

28. A composition of claim 27 in which the nylon is an N-alkoxyalkyl polyamide.

29. A composition of claim 28 in which the solvent is dimethyl sulfoxide.

30. A composition of claim 29 in which the nylon is an N-methoxymethyl polyamide.

31. A composition of claim 18 in which said polyamide is cross-linked.

32. A composition of claim 22 in which said polyamide is cross-linked.

33. A composition of claim 10 in which the polyamide is N-methoxymethyl polyamide which is cross-linked by acid catalysis.

34. A hydrophilic, semi-permeable polymer membrane composition containing a minor amount sufficient to form a complex with aliphatically-unsaturated hydrocarbons in the presence of water, of a noble metal component which, in the presence of water, provides cations that are capable of forming a complex with aliphatically-unsaturated hydrocarbons, said polymer composition consisting essentially of film-forming polycarbonamide and sufficient water-soluble polyvinyl alcohol to enhance the hydrophilic properties of the polycarbonamide and provide said hydrophilic composition.

35. A composition of claim 34 in which the noble metal is silver.

36. A composition of claim 35 in which the polymer composition consists essentially of about 30 to 90% polycarbonamide and about 10 to 70% of polyvinyl alcohol based on their combination.

37. A composition of claim 35 which contains about 5 to 25% of said noble metal.

* * * * *